June 14, 1960  J. MAURICE ET AL  2,940,569
CLUTCHES
Filed Jan. 27, 1954  4 Sheets-Sheet 1
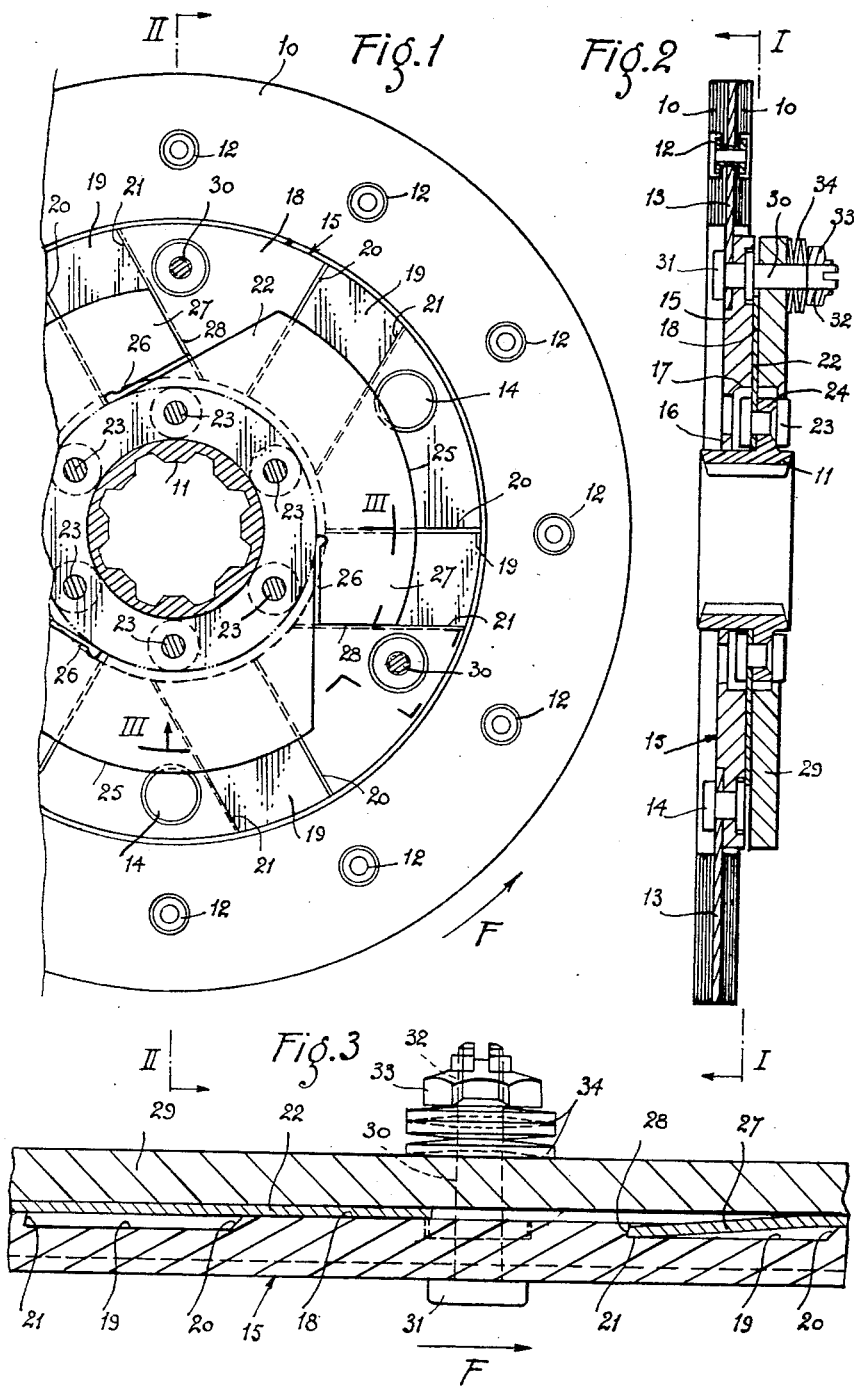

June 14, 1960   J. MAURICE ET AL   2,940,569
CLUTCHES
Filed Jan. 27, 1954   4 Sheets-Sheet 2

Fig. 6
Fig. 7
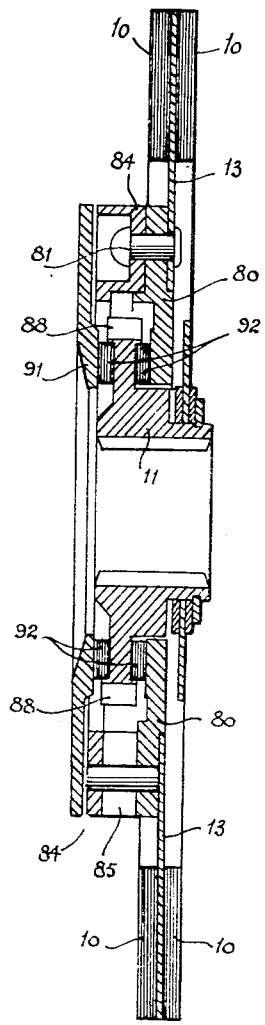
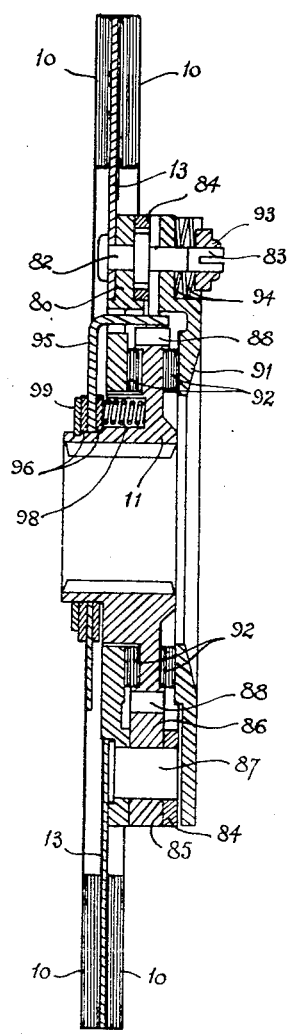

United States Patent Office 2,940,569
Patented June 14, 1960

2,940,569
CLUTCHES

Jean Maurice, Ablon, and Michel Rist, Paris, France, assignors to Société Anonyme Francaise du Ferodo, Paris, France, a corporation of the French Republic Filed Jan. 27, 1954, Ser. No. 406,528

Claims priority, application France Jan. 27, 1953

2 Claims. (Cl. 192—48)

The present invention relates to clutches of the kind comprising, between a driving shaft turning in one single direction of rotation and a driven shaft connected through a transmission, such as a gear-box, to the driving wheels of a vehicle, a friction-clutch formed by at least one pair of friction surfaces. By means of a control arrangement, these surfaces may either be totally disengaged, or they may have a limited sliding action or slip when starting-off or changing gear, or they may transmit the full torque of the engine without slip. The invention is more particularly concerned with clutches of the kind referred to, in which the control of the said friction is automatic, for example centrifugal, and still more particularly with centrifugal clutches associated with synchronised gear-boxes.

These clutches make the work of driving both easy and pleasant and reduce the risk of error to a minimum, but on the other hand, they give rise to dangers which are not negligible. In the first place, the automatic nature of the operation of the clutch removes from the direct control of the driver the determination of the time intervals and of the amount of declutching during re-starting and changing gear. If this does not prove troublesome when starting-off, since the centrifugal mechanism connected to the driving shaft brings into operation a very gradual clutch engagement whereby all risk of stalling is eliminated, on the other hand, changes of gear and more particularly changing-down of gears may result in jerks in the transmission which may eventually lead to skidding of the driving wheels of the vehicle. For example, when passing from third gear to second gear, and when the driver releases the accelerator to slow-down the vehicle, the synchronised gear-box enables an immediate operation to follow in which the driving shaft is immediately coupled to a driven shaft, the speed of which, multiplied by the ratio of the selected combination, has become greater than its own speed. The driving shaft thus introduces into the transmission at the end of the period of slip, by reason of the forces of inertia which are additive to the desired braking effect due to the compression of the engine, a braking couple which is sufficient to cause the driving wheels to skid. The longer this skidding period lasts, the more dangerous it becomes. It lasts for the time required to accelerate, under its influence, the speed of the engine until this is equal to the speed of the driven shaft, which latter is determined by the speed of the vehicle. The duration of the skidding period increases as the difference increases between the speeds of the driving shaft and the driven shaft. The danger of skidding thus becomes more serious when the driver has allowed the engine to slow-down to a greater extent and when the selected gear combination differs more widely from the first combination.

The present invention has for its object improvements in clutches of the type referred to which avoid the drawbacks indicated.

In accordance with the invention, in a clutch having a driving shaft, a pair of plates rigid in rotation with said driving shaft, a driven shaft, a friction disc located between said plates, connection means between said plates permitting axial movement of one of said plates with respect to the other plate, control means for axially displacing said one plate to selectively grip and release said friction disc between said plates, and a one-way coupling device between said friction disc and said driven shaft, there is provided a combination with said friction disc, said driven shaft and said one-way coupling device of an auxiliary clutch device disposed between said friction disc and said driven shaft, said auxiliary clutch device having friction elements separate and independent from said plates, operably coupling said friction disc and driven shaft, and spring means acting continuously under a predetermined constant load on said friction elements biasing them into frictional engagement whereby said auxiliary clutch device is continuously engaged with a predetermined transmissible torque between said driven shaft and said friction disc when said one-way coupling device over-runs.

Further objects, features and advantages of the invention will furthermore become clear from the description which follows below of forms of embodiment chosen by way of example with reference to the attached drawings, in which:

Fig. 1 is a partial view of an arrangement in accordance with the invention in transversal cross-section following the line I—I of Fig. 2;

Fig. 2 is a view of this arrangement in longitudinal cross-section following the line II—II of Fig. 1;

Fig. 3 is a partial view on a larger scale of the arrangement in cross-section following the broken and curved line III—III of Fig. 1;

Figs. 6 and 7 are views of this alternative form in longitudinal cross-sections following the broken line VI—VI and the broken line VII—VII respectively of Fig. 5.

Figure 4:
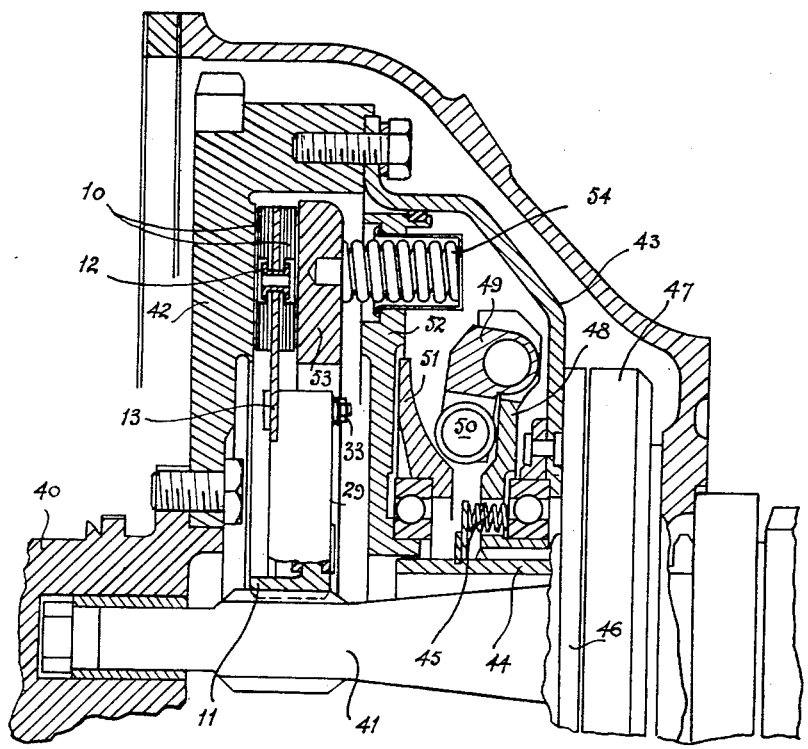
Fig. 4 is a partial view of a centrifugal clutch provided in accordance with the invention with the arrangement of Figs. 1 to 3.

In the form of embodiment shown in Figs. 1 to 4, which is concerned, by way of example, with an application of the invention to an automatic clutch of the centrifugal type associated with a synchronised gear-box for an automobile vehicle, there will be seen in Fig. 4 at 40 the driving shaft of the centrifugal clutch and at 41 the driven shaft which forms the primary shaft of the synchronised gear-box. The driving shaft 40 is integral with a reaction plate 42 which itself is fixed to a protecting casing 43. A sleeve 44, which is slidably and freely mounted on the casing 43, but which is restrained axially by a spring 45, surrounds the driven shaft 41 and is fixed to a friction collar 46. The latter is inserted between the casing 43 and an electro-magnet 47 so that when the electro-magnet is de-energized with a view to engaging the clutch, the sleeve 44 is caused to rotate with the casing 43, while when the electro-magnet is energized in order to disengage the clutch, the sleeve 44 remains stationary.

The head-carrier 48, which rotates with the sleeve 44 but which has a fixed axial position, is provided with heads 49 having rollers 50. The latter co-operate with a cam 51 which is freely mounted but which is axially locked to a transfer-plate 52. The plate 52 is mounted in such a way that it can move axially with respect to the presser-plate 53 which also slides with respect to the reaction-plate 42, the plates 52, 53, 42, being arranged to rotate together.

A set of clutch springs 54, acting under compression, is inserted between the transfer-plate 52 and the presser-plate 53.

The reaction-plate 42 and the presser-plate 53 are intended to press between them the friction linings 10 of a friction-disc 13. The linings 10, which are fixed by means of rivets 12 to the disc 13 are connected (Figs. 1 to 4) to a fluted hub 11 which rotates together with the primary shaft 41 of the synchronised gear-box of the vehicle through the medium of an arrangement which, in accordance with the invention, enables the entire transmission of the motor torque when the latter is effectively propelling the vehicle but only permits the transmission of a safe limited value of the motor torque when this torque is constituted by a braking torque of the vehicle.

In accordance with this arrangement, the disc 13, which is ring-shaped, is fixed by means of rivets 14 to a central plate 15 freely mounted around the hub 11. The plate 15 which is formed with a thin annular portion 16 adjacent the hub, comprises an external annular shoulder 17 having a generally flat annular face 18 on the side opposite to the disc 13.

In the flat face 18 of the plate 15 are arranged notches 19 which are regularly spaced around the axis of the plate. Each notch 19 is not deep but is relatively wide and extends between the external and internal circular contours of the face 18 with a straight side 20 approximately radial and a straight side 21 parallel to the side 20 and which is therefore appreciably inclined with respect to a radial direction, which is to say, eccentric.

The direction of rotation of the linings 10 and of the plate 15 is shown by the arrow F in Figs. 1 and 3, and as can be seen in these figures, the radial side 20 of each notch 19 precedes the eccentric side 21 in the direction F of rotation, the side 20 being inclined at an open obtuse angle with respect to the running face 18, while the side 21 is inclined at an acute re-entrant angle with respect to the said face (Fig. 3).

A small plate 22 is fixed by means of rivets 23 to a flange 24 of the hub 11. The rivets 23 project (Fig. 2) opposite the thin portion 16 of the plate 15 so that the small plate 22 may be applied without difficulty against the projecting face 18.

The small plate 22 has a generally flat shape with a circular contour at 25 which is cut out at 26 so as to form a number of separate feet 27. The latter are arranged at regular intervals and form projections facing the opposite direction to the direction F. Each foot 27 is bent towards the plate 15 and has an external edge 28 which is eccentric and chamfered-off in order that for at least one relative angular position of the small plate and the plate 15, all the edges 28 are applied exactly against the re-entrant edges 21 of the notches 19 and serve as buttress-supports.

In the example shown, six equally spaced notches and three equally spaced feet are provided, the edge 28 of each foot being thus able to come into contact with the edge 21 of any one of the six notches 19.

An annular back-plate extends around and is spaced from the flange 24 and is mounted so that it rotates with the plate 15 but is free to move laterally with respect to this plate by sliding engagement with the projecting limbs 30 of rivets 31 fixed to the plate 15 and to the disc 13 and alternating with the rivets 14, the small plate 22 being arranged between the plate 15 and the back-plate 29.

The extremity of each limb 30 is threaded at 32 to take a nut 33, spring washers 34 being provided between the back-plate 29 and the nut 33, so that by screwing up the nuts 33 more or less tightly, the gripping of the small plate 18 between the plate 15 and the back-plate 29 may be regulated.

When the driving torque is impressed on the linings 10, the plate 15 and the back plate 29 is applied effectively to the propulsion of the vehicle, that is to say when the plate 15 tends to rotate more quickly in the direction F than the hub 11 and the small plate 22, the edges 21 of three of the notches 19 abut against the edges 28 of the bent feet 27 and the driving torque is wholly transmitted by the friction linings 10 to the hub 11.

When the engine torque is applied to the linings 10, the plate 16 and the back-plate 29 is a braking torque of the vehicle, that is to say when the hub 11 and the small plate 22 tend to rotate more quickly in the direction F than the plate 15, the feet 27 tend to disengage themselves from the notches 19 but such a disengagement and also the sliding of the small plate 22 with respect to the plates 15 and 29 are opposed by the friction between the small plate and these plates and also by the restoring-spring effect of the bent portions of the feet 27. Such a resistance, which can be regulated at will by the tightening of the nuts 33, is expressly chosen in accordance with the invention so that it may be slightly less, with a margin of safety, than the value which corresponds to the torque necessary to cause skidding of the wheels of the vehicle.

If the braking effect of the engine is less than that chosen resistance, the braking torque will be faithfully transmitted, but if the braking due to the engine is abrupt and greater than the resistance chosen, the braking torque which is effectively transmitted will be limited to that resistance and will thus be only a fraction of the too-dangerous braking torque of the engine. Such an upper limit for the torque which can be transmitted by the safety-friction device depends on the conditions of adhesion to the ground. As has already been stated, there is an advantage in assuming the coefficient of adhesion for the worst conditions met with in normal use. For example, the coefficient of adhesion is chosen in the neighbourhood of 0.4 for automobile vehicles on the road. However, this coefficient may vary between very wide limits; it reaches for example 0.9 with good tires on first-class roads and may be as low as 0.1 on roads covered with ice. Under special conditions of use, such as sports competitions in dry weather or in traffic where there is danger of icy roads, according to the invention the safety-friction device will be calculated on the basis of the particular coefficient of adhesion so as to take full advantage without danger of the highest braking torque. However this may be, it will be appreciated that with adhesion conditions different from those which have served as the basis of the calculation of the safety-friction device, skidding will be at least very much reduced in its duration and, for that very reason, not very dangerous, if it is not actually totally eliminated.

The arrangement in accordance with the invention is of quite special interest in the example shown of a centrifugal clutch. In fact, in an automatic transmission of this kind, the engagements of gear are rapid, particularly in changing down in speed where the primary shaft 41, which is rotating at a speed appreciably greater than that of the shaft 40, is automatically and abruptly coupled with this shaft 41 by reason of the action of the heads 49 (Fig. 4), without the driver being able to intervene and before the vehicle has had time to slow-down to any extent. In the absence of an arrangement such as provided by the invention, there may result an excessive braking from the engine sufficient to cause skidding of the driving wheels.

This condition would be likely to be feared still more in the case of a synchronised gear-box, since the driver does not then have to worry about avoiding clashing of the gears.

It will be appreciated that the centrifugal clutch with a synchronised gear-box provided, according to the invention, with a suitable limiter of braking torque, retains all the advantages of such an automatic transmission and is at the same time free from the serious dangers to which they give rise.

It will also be noted that the friction disc which forms the torque limiter is built into the interior of the clutch constructon and not to the exterior, so that the overall dimensions of the clutch improved in this way remain the same as those of a normal clutch. In addition, the friction disc with limiter is of light construction which in practice does not unduly affect the inertia of the driven shaft 41 of the clutch.

In an alternative form (Figs. 5, 6 and 7), the arrangement is analogous to that which has just been described with reference to Figs. 1 to 4, except that the friction disc forming the torque limiter is modified.

Figure 5:
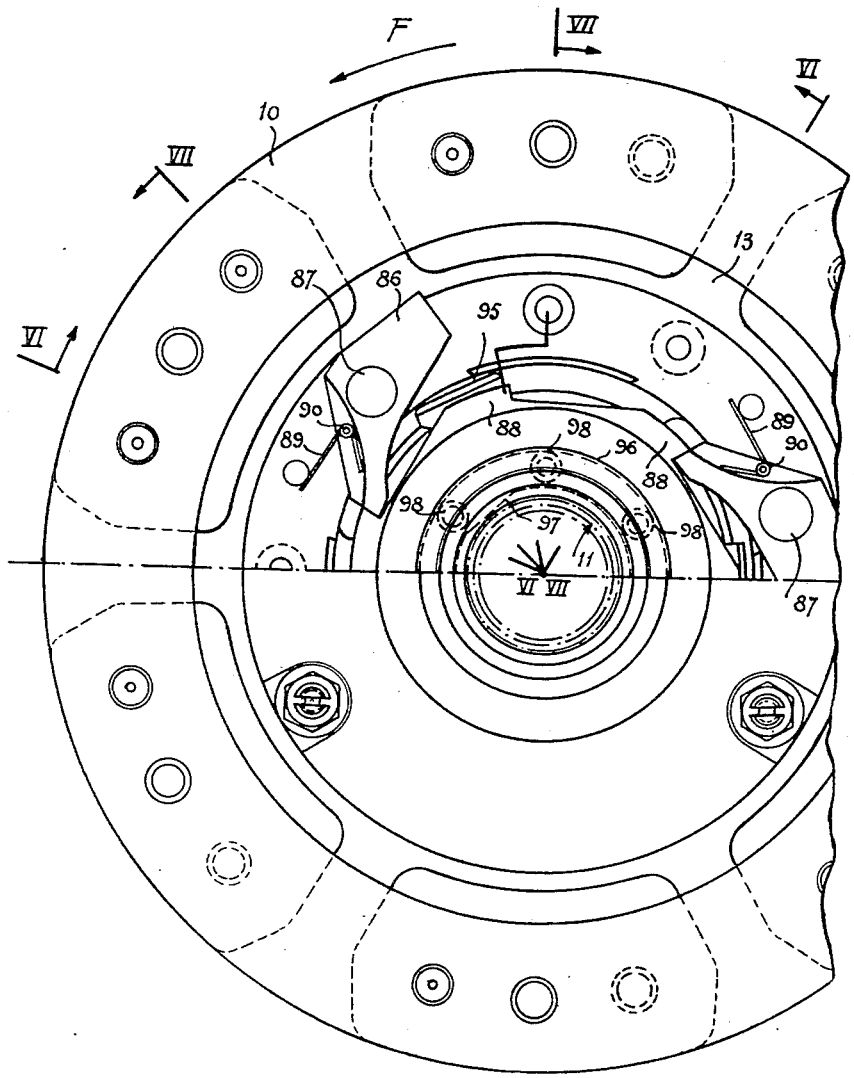
Fig. 5 is a view similar to that of Fig. 1 but which illustrates an alternative form.

There will be recognized in the Figs. 5 to 7, the friction-linings 10 and the disc 13 on which these linings are mounted. The disc 13 is fixed to a plate 80 by ordinary rivets 81 alternating with rivets 82 provided with extended portions threaded at 83. A ring 84 is fixed by means of the rivets 81 to the plate 80 and is provided with housings 85. Pawls 86 are arranged in the housings 85 and pivot about axes 87 fitted in the ring 84 and in the plate 80. The pawls 86 co-operate with a rack on the hub 11 of the friction disc and springs 89 wound round pivots 90 tend to maintain the pawls 86 in engagement with the teeth of the rack 88.

A plate 91 is engaged on the rivets 82 so that it may rotate together with the ring 84 while being capable of axial displacement with respect to this latter. The plate 91 is intended to grip rings 92 made of friction material and interposed between the plate 91, the hub 11 and the plate 80. The tightening together of the rings 92 is effected by nuts 93 screwing on to the threaded extensions 83 and acting on the plate 91 through the medium of spring washers 94.

A pawl-lifting device 95, freely mounted around the hub between two positions which are close together, is gripped between two friction rings 96 of bronze, which are fixed to the hub 11 by means of flat strips 97. The gripping action on the device 95 between the rings 96 is effected by means of springs 98 which are retained against an annular abutment 99.

When the driving torque applied to the linings 10, the disc 13, the plates 80 and 91 and the ring 84 become effective in propelling the vehicle, that is to say when the ring 84 tends to rotate more quickly in the direction of rotation F than the hub 11 and the rack 88, the pawls 86 under the control of the springs 89 are engaged in the teeth of the rack 88 and the driving torque is wholly transmitted, whatever its value may be, to the hub 11.

With the driving couple impressed on the linings 10, the disc 13, the plates 80 and 91 and the ring 84 is a braking torque due to the vehicle, that is to say when the hub 11 and the rack 18 tend to rotate more quickly in the direction F than the ring 84, the pawls 86 are raised and the torque transmitted depends on the pressure exerted by the rings 94 on the rings 92 which are of friction material. But the pawl-lifting device carries out an angular movement under the effect of the bronze rings 96 and comes to rest under the pawls, thus preventing them from re-engagement. In this way, all noise is eliminated and there is no chattering of the pawls.

In the same way as for the form of embodiment of Figs. 1 to 4, according to the invention, the tightening of the nuts 93 is adjusted in such a way that the frictional resistance of the rings 92 is slightly less, with a margin of safety, than the value which corresponds to the torque necessary to cause skidding of the wheels of the vehicle.

In addition to this safety, it will be noted that the pawl-raising device 95 ensures silent operation which is of particular value in a clutch of an automobile vehicle.

It will be understood that, when the transmission of power is re-established in the normal direction, the pawl-raising device 95 is displaced backwards and frees the pawls which are then able to re-engage with the rack 88.

What we claim is:

1. A clutch comprising a driving shaft rotative in a single direction of rotation, a driven shaft, a reaction-plate carried by said driving shaft, a presser-plate, a transfer-plate, all of said plates being rotative in unison, clutch springs disposed between said transfer-plate and said presser-plate, a friction disc having friction linings fixed on both its faces adjacent its periphery, control means acting axially on said transfer-plate for selectively gripping said friction linings between said reaction-plate and said presser-plate, a splined hub mounted on said driven shaft and adapted to rotate therewith, one-way coupling means for coupling said hub to said friction disc, said one-way coupling means comprising a ratchet-wheel having teeth and integral with said hub, an annular member fixed to said friction disc having recesses formed therein, pivotally-mounted spring-loaded pawls in said recesses and adapted to engage the teeth of said ratchet-wheel, said pawls and teeth cooperating to render said one-way coupling means operative when said driving shaft tends to rotate more rapidly than said driven shaft and rendering said one-way coupling means inoperative when said driven shaft tends to rotate more rapidly than said driving shaft, a pawl-lifting device adapted to prevent contact of said pawls with said ratchet-wheel when said one-way coupling means is inoperative, friction-rings disposed one on each side of said ratchet-wheel, a circular plate fixed to said annular member, a circular pressure plate adjustably secured to said circular plate and adapted to press said friction rings and said ratchet-wheel between said circular plate and said pressure plate thereby constituting a safety-friction device which acts as a torque limiter when said one-way coupling is inoperative.

2. In a clutch having, a driving shaft, a pair of plates, rigid in rotation with said driving shaft, a driven shaft, a friction disc located between said plates, connection means between said plates permitting axial movement of one of said plates with respect to the other plate, control means for axially displacing said one plate to selectively grip and release said friction disc between said plates, and a one-way coupling device between said friction disc and said driven shaft, in combination with said friction disc, said driven shaft and said one-way coupling device an auxiliary clutch device disposed between said friction disc and said driven shaft, said auxiliary clutch device having friction elements separate and independent from said plates, operably coupling said friction disc and driven shaft, and spring means acting continuously under a predetermined constant load on said friction elements biasing them into frictional engagement whereby said auxiliary clutch device is continuously engaged with a predetermined transmissible torque between said driven shaft and said friction disc when said one-way coupling device over-runs.

References Cited in the file of this patent

UNITED STATES PATENTS

| | | |
|---|---|---|
| 1,743,076 | Howard | Jan. 7, 1930 |
| 1,886,323 | Wemp | Nov. 1, 1932 |
| 1,902,701 | Hegemann | Mar. 21, 1933 |
| 1,935,459 | Ryan et al. | Nov. 14, 1933 |
| 2,055,803 | Rafter | Sept. 29, 1936 |
| 2,090,265 | Padgett | Aug. 17, 1937 |
| 2,136,811 | Burtnett | Nov. 15, 1938 |
| 2,682,942 | Thunstrom et al. | July 6, 1954 |
| 2,718,797 | Gravina | Sept. 27, 1955 |